(12) United States Patent
Stein et al.

(10) Patent No.: US 8,745,817 B2
(45) Date of Patent: Jun. 10, 2014

(54) ARRANGEMENT OF A MOTOR PROTECTION FILTER IN A VACUUM CLEANER

(75) Inventors: Thomas Stein, Velbert (DE); Bernd Falkenstein, Wuppertal (DE)

(73) Assignee: Stein & Co. GmbH, Velbert (DE)

( * ) Notice: Subject to any disclaimer, the term of this patent is extended or adjusted under 35 U.S.C. 154(b) by 639 days.

(21) Appl. No.: 13/038,812

(22) Filed: Mar. 2, 2011

(65) Prior Publication Data

US 2011/0232024 A1    Sep. 29, 2011

(30) Foreign Application Priority Data

Mar. 23, 2010   (DE) .......................... 10 2010 012 636
Jul. 8, 2010    (DE) .......................... 10 2010 026 441

(51) Int. Cl.
| | |
|---|---|
| A47L 9/10 | (2006.01) |
| A47L 9/12 | (2006.01) |
| A47L 9/20 | (2006.01) |
| A47L 5/00 | (2006.01) |
| A47L 9/00 | (2006.01) |

(52) U.S. Cl.
USPC ............................................ 15/347; 15/327.7

(58) Field of Classification Search
USPC .................................................. 15/347, 327.7
See application file for complete search history.

(56) References Cited

U.S. PATENT DOCUMENTS

| | | | | | |
|---|---|---|---|---|---|
| 2,794,513 | A | * | 6/1957 | Hultberg et al. ................ | 55/366 |
| 3,055,161 | A | * | 9/1962 | Hallstrom ....................... | 55/356 |
| 3,621,640 | A | * | 11/1971 | Ohno et al. ..................... | 55/300 |
| 3,816,983 | A | * | 6/1974 | Sawada et al. .................. | 55/357 |
| 3,856,488 | A | * | 12/1974 | Kato et al. ...................... | 55/300 |
| 4,276,070 | A | * | 6/1981 | Hug ............................... | 55/429 |
| 4,545,794 | A | * | 10/1985 | Himukai ........................ | 55/362 |
| 4,745,654 | A | * | 5/1988 | Yamamoto et al. ............. | 15/344 |
| 2007/0209146 | A1 | * | 9/2007 | Mersmann et al. ............. | 15/347 |
| 2009/0265882 | A1 | * | 10/2009 | Rhea et al. ...................... | 15/350 |

* cited by examiner

*Primary Examiner* — Bryan R Miller
(74) *Attorney, Agent, or Firm* — W. F. Fasse

(57) ABSTRACT

A vacuum cleaner has a lid that selectively opens or closes a filter bag compartment. A secondary motor protection filter is removably mounted in the lid by a frame of an elastic material that simultaneously seals the secondary filter element to the lid and seals the lid onto the bag compartment. An air passage flows between the secondary filter and the lid through a duct to the suction motor compartment. A perimeter groove in the lid receives a spline of the elastic frame of the filter element in a removable manner, while the opposite surface of the frame forms the seal surface relative to a housing rim around the bag compartment.

17 Claims, 2 Drawing Sheets

ARRANGEMENT OF A MOTOR PROTECTION FILTER IN A VACUUM CLEANER

PRIORITY CLAIM

This application is based on and claims the priorities under 35 USC 119 of German Patent Applications 10 2010 012 636.5, filed on Mar. 23, 2010 and 10 2010 026 441.5, filed on Jul. 8, 2010, the entire disclosures of which are incorporated herein by reference.

FIELD OF THE INVENTION

The invention relates to an arrangement of a secondary motor protection filter in the area of the filter bag compartment of a vacuum cleaner.

BACKGROUND INFORMATION

Arrangements of the abovementioned general type are known in various configurations and embodiments in the prior art. For example, a surfacial fleece filter element is held by a frame, which is then mounted in the area of the filter bag compartment of the vacuum cleaner. An air flow path leads from the filter bag compartment, through the filter element, and then through passages or ducts to the suction motor compartment of the vacuum cleaner. Thereby it is ensured that no debris can be sucked into the suction motor unit.

The known arrangements all suffer several difficulties, problems, and disadvantages as follows. It is necessary to provide one or more seals around the secondary motor protection filter relative to the bag compartment lid and/or relative to the bag compartment in order to ensure that the air flows properly from the bag compartment through the motor protection filter and then to the suction motor unit. In the known arrangements, the configuration and arrangement of the necessary seals and fastening elements are relatively complicated and thus also the installation thereof is rather cumbersome. Therefore, the handling that is necessary during an exchange of the motor protection filter causes significant difficulties for the user of the vacuum cleaner, in order to then again achieve a proper installation of the motor protection filter and the associated seals to ensure a proper functional sealing of the filter housing. The manufacturing of the seal components and the motor protection filter is also more complex and more costly than would be desired.

SUMMARY OF THE INVENTION

In view of the above, it is an object of the invention to provide an improved and simplified arrangement of a motor protection filter in the area of the filter bag compartment, and especially in the bag compartment lid of a vacuum cleaner housing. In this regard, it is a further object of the invention to provide an improved and simplified mounting and seal arrangement of the motor protection filter, to enable an easy mounting of the filter element, and to ensure a proper seal of the motor protection filter relative to the filter housing and the bag compartment lid, whereby the motor protection filter is easy to exchange during regular maintenance, and the seal is easy to install so as to ensure a proper sealing. The invention further aims to avoid or overcome the disadvantages of the prior art, and to achieve additional advantages, as apparent from the present specification.

The above objects have been achieved according to the invention in a vacuum cleaner of which a vacuum cleaner housing encloses a motor compartment and a filter bag compartment, and a bag compartment lid is selectively openable and closeable relative to the housing in order to open or close the bag compartment. The secondary motor protection filter preferably includes a surfacially extending filter element of a filter fleece material and a frame that holds the filter element relative to the bag compartment lid. An air passage is formed between the filter element and the bag compartment lid, and this air passage communicates into the motor chamber. The frame of the filter element preferably is made of an elastic material that simultaneously forms a seal of the motor protection filter relative to the bag compartment lid and relative to the housing of the bag compartment. For mounting the motor protection filter in the bag compartment lid, the lid preferably has a perimetrical groove that receives a corresponding spline, e.g. a tongue, flange, rib or ridge of the frame of the motor protection filter. This filter frame spline can be easily inserted into or pulled out of the groove, so that it is easy to exchange the filter. The side of the frame opposite this spline serves as a seal surface that cooperates with a bounding surface or rim of the filter housing around an opening of the bag compartment, such that the motor protection filter is thereby sealed against the housing.

The above arrangement achieves the advantage that only a single seal element provided between the inflow side and the outflow side, i.e. the higher pressure side and the lower pressure side, of the motor protection filter serves to hold the motor protection filter in place on the bag compartment lid and also to seal the motor protection filter relative to the bag compartment lid and relative to the vacuum cleaner housing around the bag compartment. Namely, this single seal element mounts the motor protection filter on the bag compartment lid and seals the entire arrangement on both sides of the motor protection filter. When the motor protection filter is to be exchanged, this seal element is exchanged together with the filter element in a simple manner. Thereby, the damage-prone and relatively sensitive seal element that achieves the seal relative to the filter housing is simultaneously exchanged along with the motor protection filter. The maintenance and handling are thereby greatly simplified for the user.

According to an advantageous embodiment, the elastic material of the frame of the motor protection filter is a thermoplastic polymer material, which provides good sealing properties relative to the bag compartment lid and relative to the vacuum cleaner housing, and also forms a good supporting frame for the motor protection filter element. Furthermore, such a thermoplastic material can be easily and economically produced by injection molding or any other conventionally known plastics production technique.

Furthermore, the perimeter frame of the filter element may additionally be reinforced by a supporting framework of struts of an elastic material. This framework helps to support and strengthen the perimeter frame, and also helps to support the filter fleece material.

In order to increase the pressing or contact pressure of the seal element, it is suggested that the groove of the bag compartment lid is provided in a rib that bounds the spline of the frame on both sides, while nonetheless the frame protrudes beyond the width of the rib on at least one side. This increases the seal area, and also allows an elastic deflection or yielding flexibility of a tapering seal flange portion of the frame in order to conform to and smoothly seat against the cooperating rim of the vacuum cleaner housing around the bag compartment. The rib of the bag compartment lid ensures that the frame and seal element is pressed down firmly and uniformly onto the cooperating rim around the bag compartment.

A further preferred feature of the invention is that the motor protection filter element has a hole or cut-out to allow a filling element of the bag filling neck or stub to be accessed through or to pass through the plane of the filter element. The perimeter of this cut-out opening is embodied as a reinforcement element comprising a seal member of an elastic material. Thus, this reinforcement element cooperates with the framework and the perimeter frame to mount the filter, to support the filter element and to achieve the necessary seal.

BRIEF DESCRIPTION OF THE DRAWINGS

In order that the invention may be clearly understood, it will now be described in further detail in connection with an example embodiment thereof, with reference to the accompanying drawings, wherein.

DETAILED DESCRIPTION OF A PREFERRED EXAMPLE EMBODIMENT OF THE INVENTION

Figure 1:
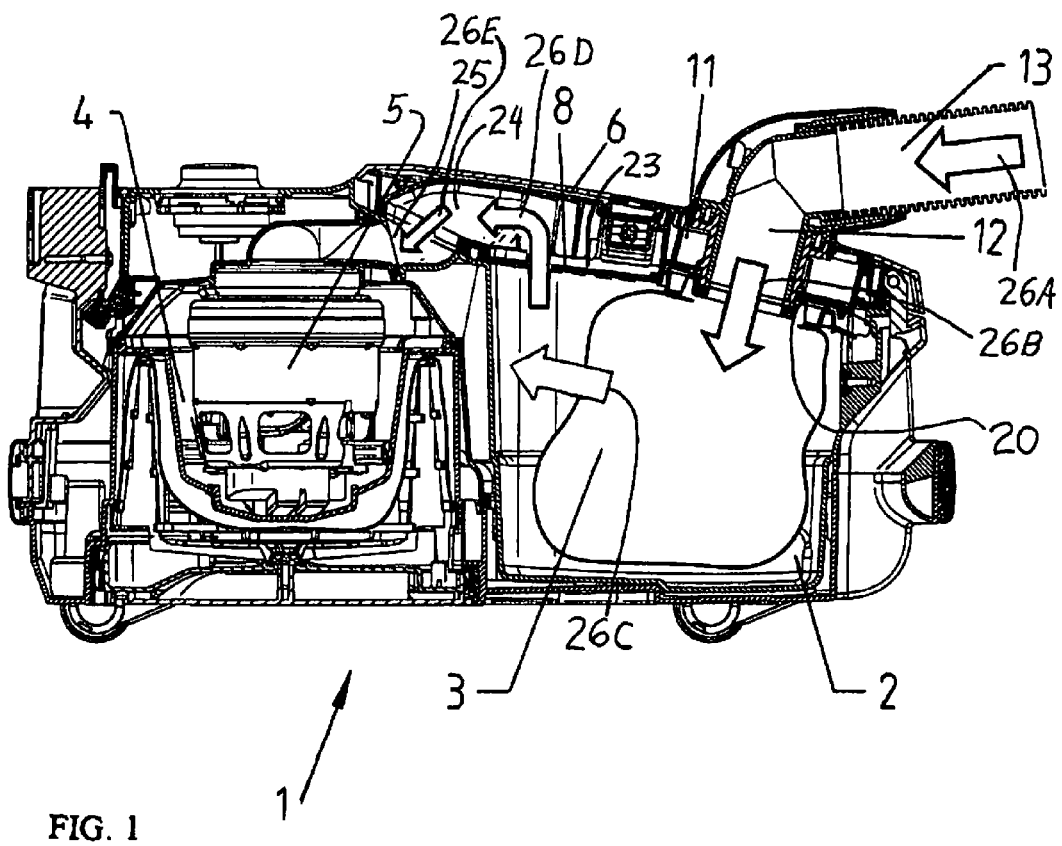
FIG. 1 is a vertical section view through a vacuum cleaner according to the invention, whereby the bag compartment lid is closed and arrows indicate the path of air through the vacuum cleaner during operation.
Figure 3:
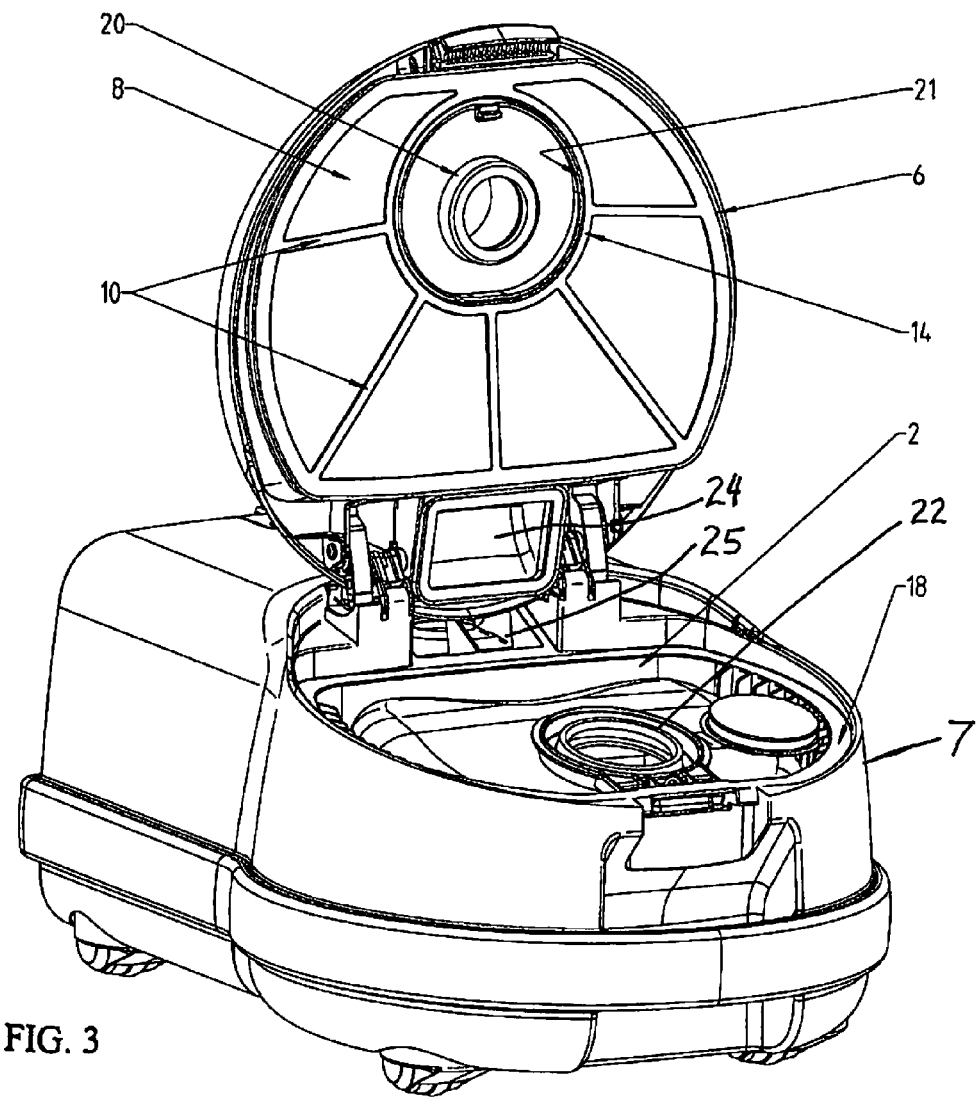
FIG. 3 is a perspective view of the vacuum cleaner of FIG. 1, but showing the bag compartment lid in an open position to display the motor protection filter element inserted therein.

The vacuum cleaner 1 illustrated in FIGS. 1 and 3 has a housing that encloses a filter bag compartment 2 and, separated therefrom, a motor compartment 4. A primary dirt filter bag 3 is inserted into the bag compartment 2. A suction motor unit 5 is arranged in the motor compartment 4. The bag compartment 2 is selectively closeable and openable by a bag compartment lid 6 that can be selectively pivoted open and closed, and then latched into place, relative to the vacuum cleaner housing 7, in any conventionally known manner. Thereby, the lid 6 uncovers or covers a major opening of the bag compartment 2.

While the primary dirt filter bag 3 is to filter-out and collect the dirt or debris in the incoming airflow, a secondary motor protection filter element 8 is additionally provided, to ensure that no debris can be sucked into the suction motor unit 5 (e.g. if the bag 3 ruptures or is improperly installed or is not installed), which would cause damage or fouling of the suction motor unit 5. Particularly, the motor protection filter element 8 is mounted in the bag compartment lid 6, while forming an air space 23 between the filter element 8 and the bag compartment lid 6. An air duct 24 is formed in the lid 6 and communicates from the air space 23 to a further duct 25 that leads to the suction motor unit 5 in the motor compartment 4. Thus, when the lid is closed and the vacuum cleaner is operating, the dirt-laden air 26A that is sucked in through the vacuum cleaner hose flows into the primary filter bag 3 as shown by arrow 26B. From there, the dirt is filtered out of the air as it permeates outwardly through the wall of the filter bag 3, so that primary filtered air 26C flows out of the bag 3 into the space of the bag compartment 2. From there, the air flows according to arrow 26D through the secondary motor protection filter element 8, to ensure that no debris or dirt can reach the suction motor unit 5. The filtered air flows through the duct 24 and then into the duct 25 as shown by arrow 26E, where the air is then sucked through the fan or impeller of the suction motor unit 5.

Figure 2:
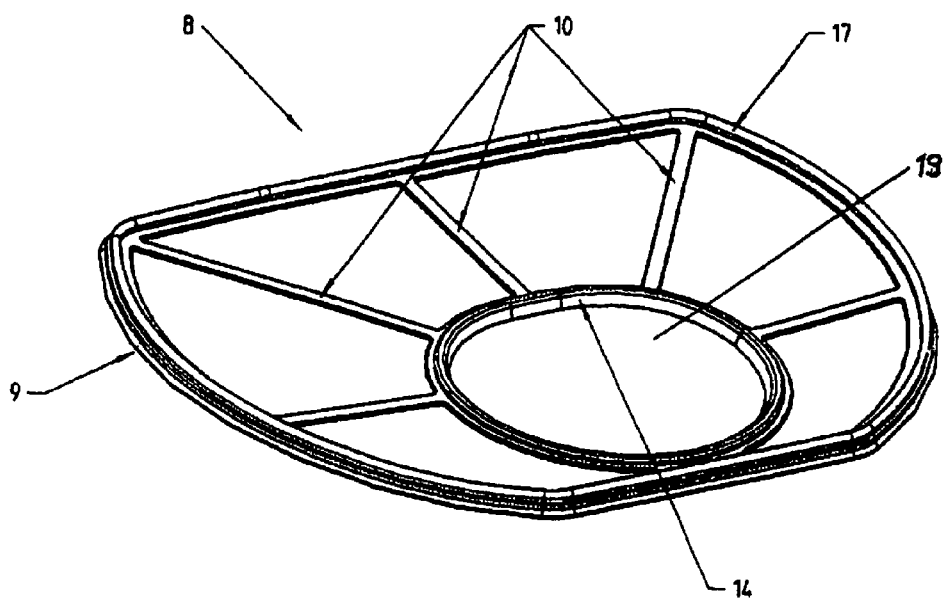
FIG. 2 is a perspective view of a motor protection filter for the inventive arrangement.

The motor protection filter element 8 is made of a filter fleece material, and is supported by a perimeter filter frame 9, and optionally but preferably further an elastic framework of struts 10 as can be seen especially in FIG. 2. Furthermore, the motor protection filter preferably has a hole or cut-out 19 for reasons that will be discussed below. This cut-out hole 19 is surrounded by a reinforcing rim 14 that is connected to the framework of struts 10 and that is also provided with a seal lip. The filter frame 9, the framework struts 10, and the reinforcing rim 14 can all preferably be made of an elastic material, preferably such as a thermoplastic polymer. This overall supporting structure including the frame 9, the struts 10, and the reinforcing rim 14 can be fabricated as one piece or as plural pieces that are snapped together, or otherwise connected together, for example by thermal welding or by an adhesive. The material or materials is or are selected to simultaneously provide adequate support for the motor protection filter and provide an effective seal function.

The bag compartment lid 6 is outfitted with a receptacle 11 and holding fixture for receiving a hose stub or cuff 12 that is to be inserted therein. The hose cuff 12 includes a hose connector 13 to which the vacuum hose is connected. Thereby, the vacuum hose with its cuff 12 can be "plugged in" to the vacuum cleaner for use. For this, the hose stub or cuff 12 must communicate in a sealed manner into the primary filter bag 3. In this regard, the hose receiving receptacle 11 passes into or through, or communicates through, the cut-out hole 19 of the motor protection filter 8, and may form a seal against the seal lip of the reinforcing rim 14, which is configured and dimensioned to cooperate with the receptacle 11 or a filter bag filling element 20. In turn, the hose cuff 12 is plugged into the receptacle 11 in a sealed manner. Furthermore, the receptacle 11 is connectable in a sealed manner, for example by rotation, with respect to the filter bag filling element 20. The cut-out hole 19 of the motor protection filter element 8, and particularly the reinforcing element 14 is fitted in a sealed manner to an outer surface 21 of the filling element 20. In this manner, the filling element 20 is sealedly engaged with the fill opening 22 of the filter bag 3 when the hose cuff 12 is plugged into the receptacle 11 and the bag compartment lid 6 is pivoted to its closed position.

Figure 4:
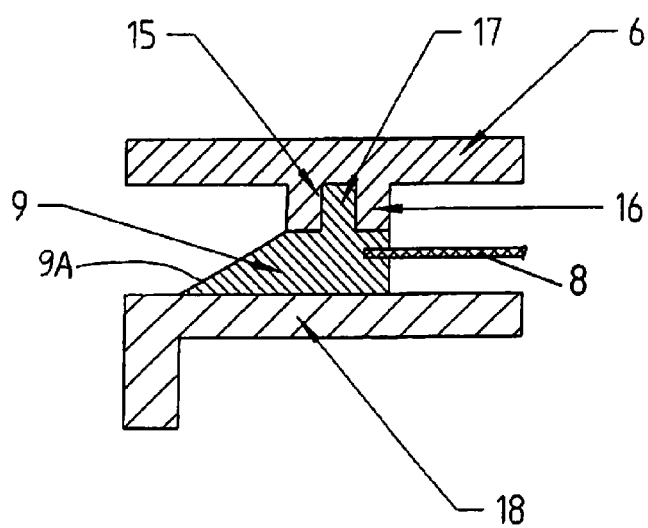
FIG. 4 is a simplified schematic vertical section view of the filter frame and an edge portion of the bag compartment lid in a closed position, with the motor protection filter inserted and forming a seal between the lid and the bag compartment housing.

The frame 9 of the filter element 8 achieves the mounted connection and sealing of the filter element 8 to the bag compartment lid 6. For this purpose, the frame 9 is made of an elastic thermoplastic polymer. To allow the filter element 8 along with its frame 9 to be easily exchanged for maintenance, the bag compartment lid 6 has an encircling perimeter groove 15 in a thickened rib 16. A spline (e.g. or a tongue, flange or ridge) 17 of the frame 19 of the filter element 8 is easily insertable into this groove 15 in a sealed manner, and is also easily removable therefrom by manually pulling it out. When the frame 9 is installed in this manner in the groove 15, when the lid 6 is closed, then a sealing surface of the frame 9 lies in contact on a corresponding cooperating boundary surface or rim 18 of the housing 7 around the bag compartment 2. Thereby the frame 9 forms a seal against the rim 18. The rim 18 preferably extends continuously along and around an entire perimeter of the opening of the bag compartment 2, whereby the rim 18 is preferably directly adjacent to and bounding the bag compartment opening. This rim preferably (but not necessarily) lies on a flat plane, as does the frame 9 and the rib 16 with groove 17. As especially shown in FIG. 4, the frame 9 includes a tapering seal flange 9A, which protrudes laterally beyond a side of the rib 16 and can conform yieldingly to any variations in the surface of the rim 18. According to one embodiment, the motor protection filter comprising the motor protection filter element 8 and the frame 9 is removably mounted on the bag compartment lid 6 by the spline 17 received in the groove 15, and the frame 9 is held to the bag compartment lid only by the spline received in the groove without any additional fastening element. According to another embodiment, the motor protection filter including the motor protection filter element 8 and the filter frame 9 is secured to the bag compartment lid 6 only by the spline 17 received in the groove 15 and by the reinforcing rim 14 engaging the filling element 20, without any additional fastening element.

Thus, the frame 9 not only connects and seals the filter element 8 to the bag compartment lid 6, but it also forms the seal between the filter element 8 (and the lid 6) and the bag compartment 2. This ensures the proper airflow as discussed above and shown in FIG. 1, without leakage. This also provides a very simple structural arrangement for mounting and sealing the motor protection filter, and for sealing the lid relative to the bag compartment. This arrangement allows easy maintenance, i.e. replacement of the motor protection filter along with its seal frame. The motor protection filter arrangement is also simple and economical to produce.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A vacuum cleaner comprising:
   a housing that bounds therein a motor compartment and a bag compartment, which bag compartment is configured and adapted to receive a primary filter bag, wherein said housing includes a rim positioned outwardly from an opening of said bag compartment;
   a bag compartment lid that is movable relative to said bag compartment and said motor compartment between a closed position in which said lid covers said opening of said bag compartment and an open position in which said lid uncovers said opening of said bag compartment; and
   a secondary motor protection filter comprising a filter element supported by a frame made of an elastic material;
   wherein:
   said bag compartment lid has a groove therein,
   said frame of said motor protection filter has a protruding spline that is removably received in said groove, and said frame seals said motor protection filter to said bag compartment lid,
   said frame of said motor protection filter has a seal surface on a side thereof opposite said spline, and said seal surface of said frame sealingly contacts said rim of said housing when said lid is in said closed position, and
   an air passage is formed between said lid and said motor protection filter, and communicates with said motor compartment.

2. The vacuum cleaner according to claim 1, wherein said rim is directly adjacent to and directly bounds said opening.

3. The vacuum cleaner according to claim 1, wherein said rim is a flat band-shaped rim lying on a flat plane.

4. The vacuum cleaner according to claim 1, wherein said rim extends continuously along and around an entire perimeter of said opening.

5. The vacuum cleaner according to claim 1, wherein said frame extends continuously along and around an entire perimeter of said filter element, said spline extends continuously along said frame entirely around said perimeter of said filter element, said groove in said bag compartment lid is continuous entirely around said perimeter of said filter element, and said groove, said frame and said rim each have a plan shape matched to one another.

6. The vacuum cleaner according to claim 1, wherein said motor protection filter is removably mounted on said bag compartment lid by said spline received in said groove, and said frame is held to said bag compartment lid by said spline received in said groove.

7. The vacuum cleaner according to claim 1, wherein said elastic material of said frame is a thermoplastic polymer.

8. The vacuum cleaner according to claim 1, wherein said motor protection filter further comprises a framework of struts made of an elastic material, and said struts are connected to said frame and support said filter element.

9. The vacuum cleaner according to claim 1, wherein said filter element is a flat surfacially extending element of a filter fleece material.

10. The vacuum cleaner according to claim 1, wherein said bag compartment lid includes a lid wall and a rib protruding from said lid wall toward said frame, said groove is disposed in and runs along said rib, said frame is wider than said rib, and said frame protrudes laterally beyond at least one side of said rib.

11. The vacuum cleaner according to claim 10, wherein said frame includes a tapering seal flange that protrudes laterally beyond one side of said rib and that contacts sealingly on said rim.

12. The vacuum cleaner according to claim 1, wherein said air passage comprises an air space between said filter element and said bag compartment lid, and a first duct that is formed in said lid and that communicates with said air space, and wherein a second duct is formed in said housing to communicate fixedly with said motor compartment and to communicate with said first duct when said lid is in said closed position.

13. A vacuum cleaner comprising:
    a housing that bounds therein a motor compartment and a bag compartment, which bag compartment is configured and adapted to receive a filter bag, wherein said housing includes a rim positioned outwardly from an opening of said bag compartment;
    a bag compartment lid that is movable relative to said housing between a closed position in which said lid covers said opening of said bag compartment and an open position in which said lid uncovers said opening of said bag compartment; and
    a motor protection filter comprising a filter element supported by a frame made of an elastic material;
    wherein:
    said bag compartment lid has a groove therein,
    said frame of said motor protection filter has a protruding spline that is removably received in said groove,
    said frame of said motor protection filter has a seal surface on a side thereof opposite said spline, and said seal surface sealingly contacts said rim of said housing when said lid is in said closed position,
    an air passage is formed between said lid and said motor protection filter, and communicates with said motor compartment, said bag compartment lid includes a filling element adapted to communicate with an external vacuum hose and with a fill opening of the filter bag, said filter element of said motor protection filter has a hole therein, said motor protection filter further comprises a reinforcing rim around a perimeter of said hole, said reinforcing rim comprises a seal element of an elastic material, and said filling element is located in said hole.

14. The vacuum cleaner according to claim 13, wherein said seal element of said reinforcing rim seals around a perimeter of said filling element.

15. The vacuum cleaner according to claim 14, wherein said reinforcing rim aids in securing said motor protection filter to said bag compartment lid by engaging said perimeter of said filling element.

16. The vacuum cleaner according to claim 15, wherein said motor protection filter is secured to said bag compartment lid only by said spline received in said groove and by said reinforcing rim engaging said filling element, without any additional fastening element.

17. The vacuum cleaner according to claim 13, wherein said motor protection filter further comprises a framework of struts made of an elastic material, said struts are connected to said frame and support said filter element, and said reinforcing rim is connected to said struts.

\* \* \* \* \*